cation of my invention thereto. Fig. 2 is a
UNITED STATES PATENT OFFICE.

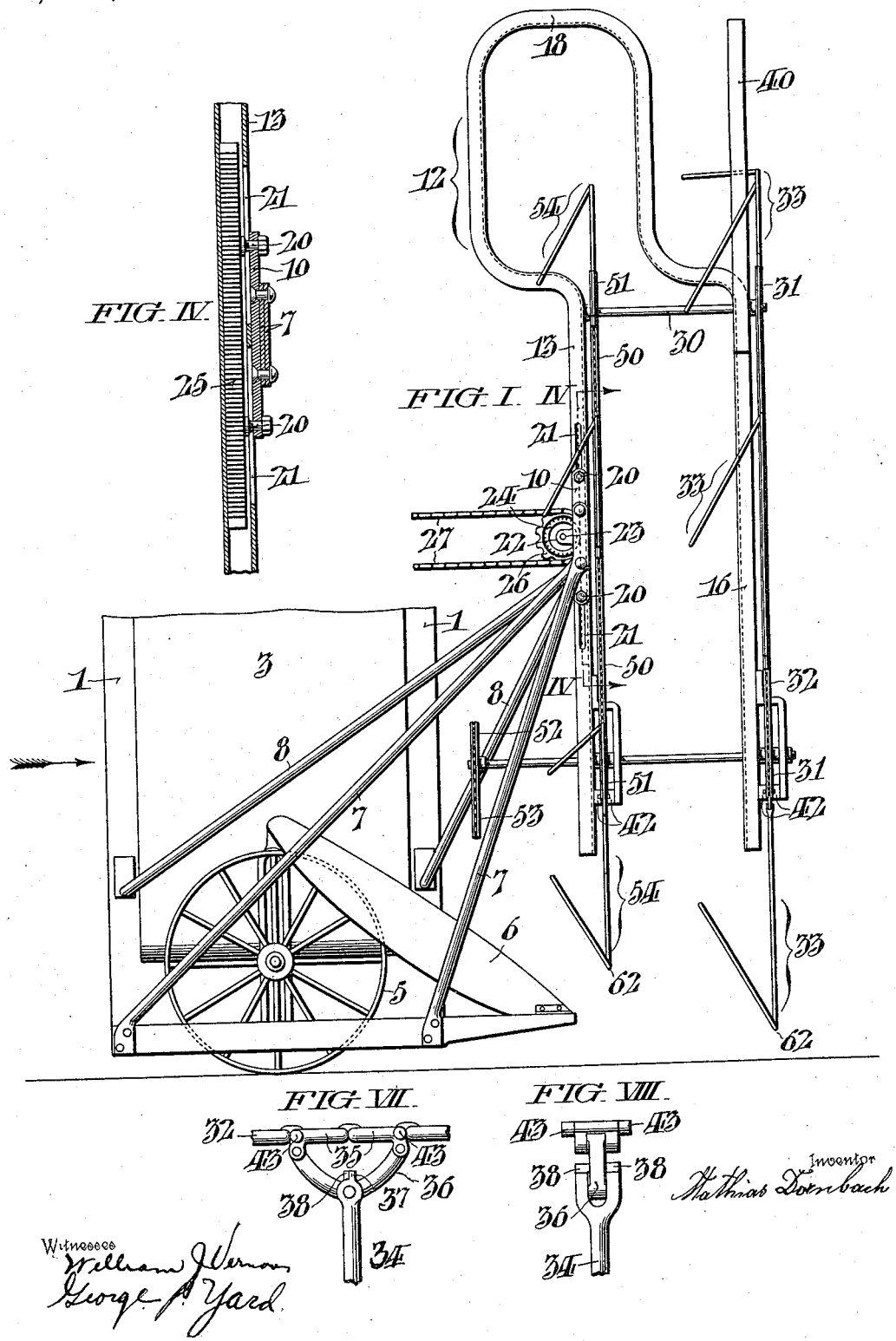

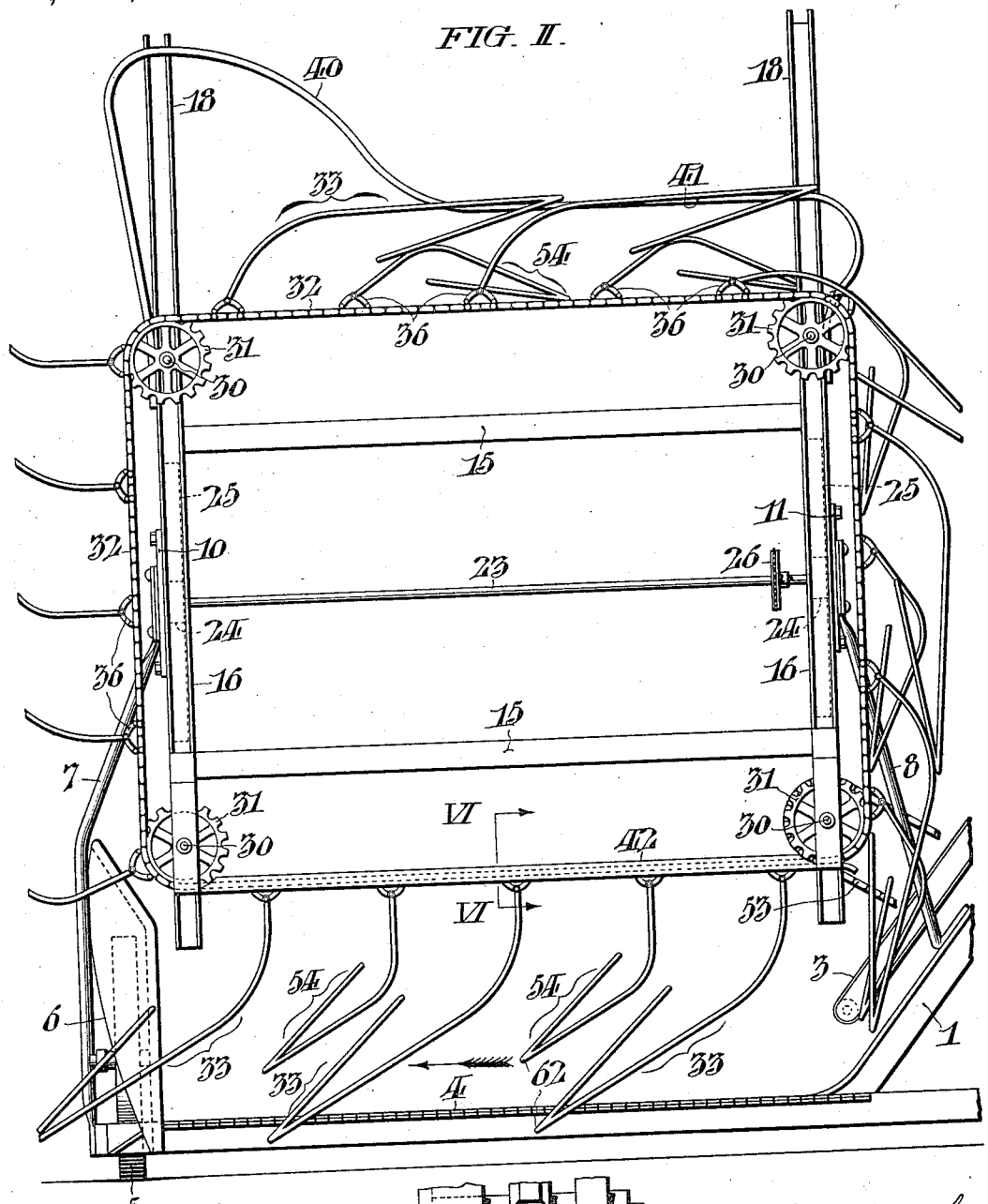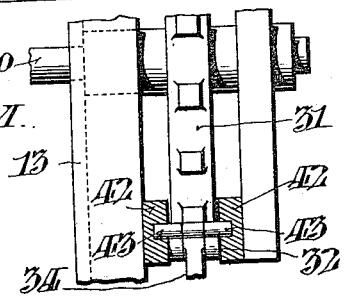

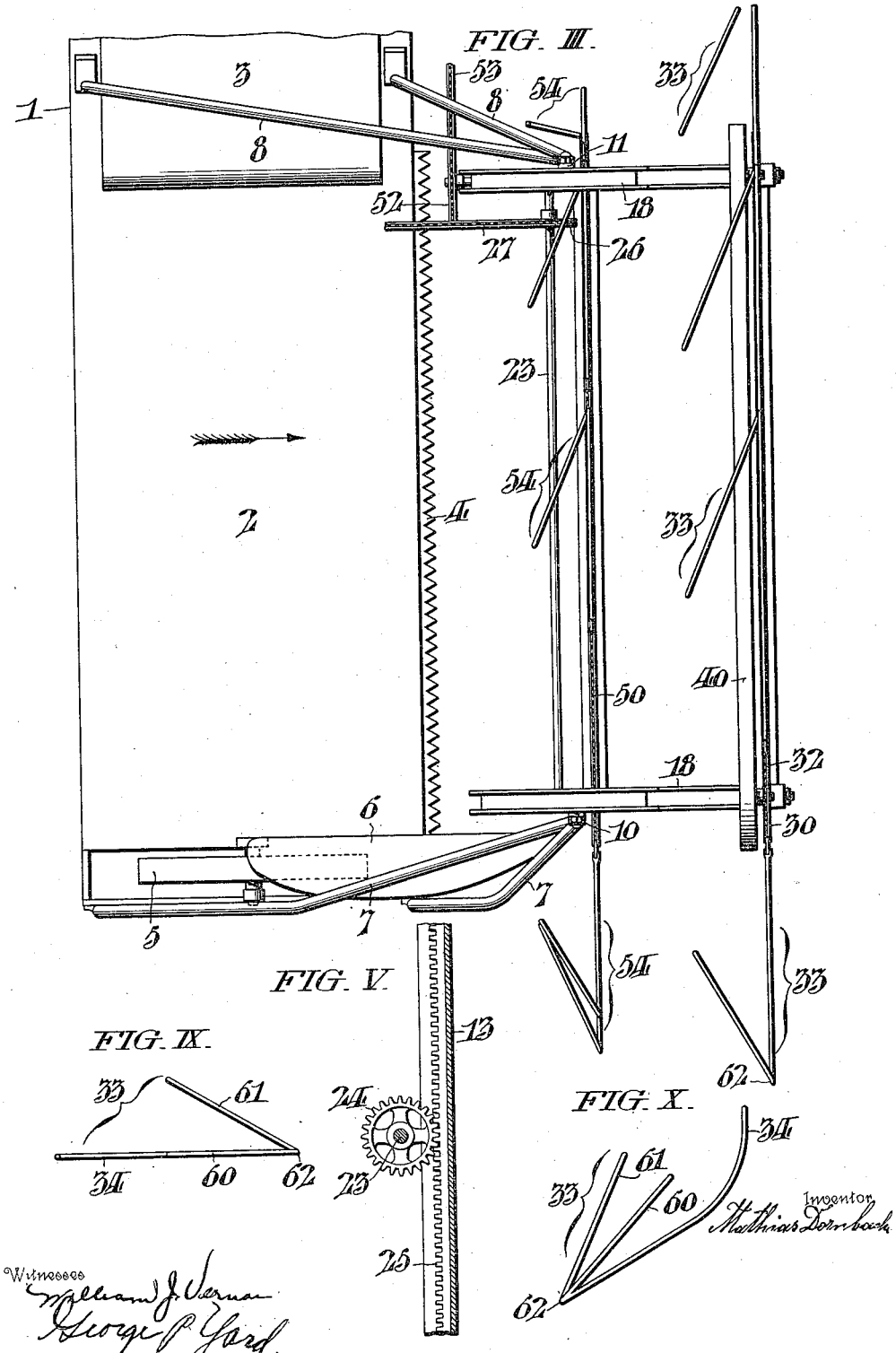

MATHIAS DORNBACH, OF PHILADELPHIA, PENNSYLVANIA.

GRAIN-ELEVATOR.

1,173,344.  Specification of Letters Patent.  Patented Feb. 29, 1916.

Application filed March 27, 1914. Serial No. 827,526.

*To all whom it may concern:*

Be it known that I, MATHIAS DORNBACH, residing in Philadelphia, in the county of Philadelphia and State of Pennsylvania, have invented certain new and useful Improvements in Grain-Elevators, of which the following is a specification, reference being had to the accompanying drawings.

My invention relates more particularly to that class of harvesting machinery commonly termed binders wherein the grain is first cut by a series of ledger knives and thereafter "knocked over" on to a horizontal conveyer moving in close proximity to the ground, said conveyer advancing the cut grain to a second inclined conveyer whereby it is in turn advanced to a suitable binding mechanism for the purpose of being bunched and tied in a manner well known to those skilled in this art.

The primary object of this invention is the provision of means whereby prostrate grain may be elevated and deflected so as to be readily engaged by the cutting knives above referred to, and to be knocked over onto the horizontal conveyer.

I am aware that heretofore devices have been provided for the purpose of elevating prostrate grain, but these have always been used in conjunction with the reels usually provided in the class of machinery for knocking over the grain onto the horizontal conveyer.

My invention contemplates the elimination of these reels and substituting therefor a single mechanism in which both of these functions are combined.

Another object of my invention is to provide a series of elevating devices adapted to move at right angles to the direction of travel of the harvesting machine and over a path corresponding to the extent of the cutting knives.

A further object is to provide individual elevating devices each having a raising prong at an incline to the horizontal conveyer and lying in the plane of movement of the said devices and a second or deflecting prong lying in the same angular plane as the raising prong but inclined rearwardly from the plane of movement of the said devices.

In the drawings, Figure 1, is a side elevation of a sufficient portion of a harvesting machine conveniently illustrating the application of my invention thereto. Fig. 2 is a front elevation of the same. Fig. 3 is a plan view of the same. Fig. 4 is a detail section taken on the line 4—4 of Fig. 1, showing the sliding connection between the supporting brackets and the frame for the elevating devices. Fig. 5 is a detail section showing one of the pinions for raising the frame for the elevating devices. Fig. 6 is a detail section taken on line 6—6 of Fig. 2 showing the method of guiding the supporting and driving chains for the elevating elements and their supporting chains. Fig. 7 is a fragmentary detail view in side elevation of the connection between the grain elevating elements 3 and the supporting sprockets chain. Fig. 8 is an edge elevational view of the structure shown in Fig. 7. Fig. 9 is a plan section of one of the elevating elements. Fig. 10 is a perspective view of the same.

In carrying out my invention, the grain elevating device is located in advance of the cutting knives and the horizontal conveyer and is suitably supported on a sliding frame capable of vertical adjustment upon supporting brackets rigidly secured to the framework of the harvesting machine.

The sliding frame for the elevating device carries a pair of spaced endless chains to each of which is pivotally attached a series of individual grain elevating elements which are adapted to move in a direction at substantially right angles to the direction of the movement of the machine. These chains are in parallel relation and are adapted to be simultaneously driven in any convenient manner from the tractor wheel of the harvesting machine. The elevating elements on the chain at the front of the machine are somewhat longer than those of the other chain and raise the grain to an angle of about 45 degrees to the horizontal at the same time deflecting it toward the shorter elevating elements on the second chain whereupon these shorter elements become effective in raising the grain still farther and simultaneously deflecting it toward the cutting knives and over onto the horizontal conveyer. In cutting tall grain, it is preferable to use two or more series of elevating elements of varying lengths but in the treatment of shorter growths this may of course be restricted to a single series depending entirely on existing conditions.

Referring more particularly to the drawings, the supporting structure of the harvesting machine is indicated at 1, the horizontal conveyer at 2, the inclined conveyer at 3, the cutting ledger knives at 4, the trailer wheel for the horizontal conveyer at 5, and the deflecting guard at 6. These parts are all well known to those skilled in this art and for this reason have not been illustrated in detail.

Rigidly secured to the frame of the machine and extending forward with respect thereto are struts 7—7 and 8—8, paired at the ends of the horizontal conveyer. These paired struts overlap at their outer ends and serve as brackets for the support of respective vertical guide plates 10 and 11. Mounted to slide upon the plates 10 and 11, is a frame comprehensively indicated at 12. This frame comprises side members 13 which are joined by transverse beams 15. The side members are supplemented by forward extensions 16 which are spaced from and are parallel to the said members and joined at their tops in the form of yokes 18. The frame 12 is adapted for vertical adjustment with respect to the plates 10 and 11 and is slidably supported by means of bolts 20 secured in the said plates and engaging slots 21 in the side members 13.

Plates 10 and 11 are provided with rearwardly projecting lugs 22 in which is journaled a shaft 23, having gear pinions 24, which engage racks 25, secured to the side members 13 and 14. See Figs. 1, 2, 4, and 5. Also mounted on shaft 23 is a sprocket wheel 26, by means of which the said shaft may be turned. A chain 27 engages the sprocket 26, and extends to any suitable controlling mechanism (not shown) convenient to the seat of the operator of the machine. By this means the frame 12 may be adjusted vertically to any position depending on the height of the grain to be cut as will more specifically be explained later.

Extending between side members 13 of the frame 12 and their extensions and journaled thereto are sprocket shafts 30. Secured to these shafts adjacent to the extensions 16 of side members 13, are sprockets 31, over which passes an endless chain 32. This chain pivotally supports a series of grain elevating elements 33, one of which is shown in detail in Figs. 9 and 10. Each of these elements comprises a shank 34, which is pivotally secured to the chain as shown in detail in Figs. 7 and 8. This chain is provided with special links 35, to which are riveted yoke pieces 36, supporting the pivots for the grain elevating elements. Above the pivot point the shank 34 is provided with a lug 38, formed on the yoke 36. By this means the elevating elements are prevented from turning upon their pivots when moving in the direction of the arrow in Fig. 2 but capable of yielding when the chain is moving over the top sprockets during the inactive or return path of travel of the said chain so that these elevating devices will collapse as shown in the said figure.

In order to arrest the fall of the elevating elements on the return path of the chain and to prevent undue slamming I have provided a curved guard 40 which is secured to the frame 12. This guard will engage the elevating elements as soon as they begin to fall and will therefore gradually allow the same to drop without any slamming or knocking. The guard may be provided with a horizontal extension 41, adapted to support the elevating elements as they move across the top of frame 12.

In order to prevent any sagging in the chain through the active portion of its travel due to the weight of the supporting elements or resistance caused by their action upon the grain, I provided the frame 12, with guide channels 42, between which the links of the chain may pass. (See Fig. 6). The grooves in these channels are oppositely disposed and adapted to engage lugs 43, projecting laterally from the chain thereby effectively supporting the same. If found desirable these guide channels may be provided along the entire course of the chain, but in order to avoid duplication and confusion, no attempt has been made to illustrate this in the drawings.

A second supporting and driving chain 50 is mounted on sprockets 51, also secured to the shafts 30 at points adjacent the front of the side members 13 of frame 12. As seen from Figs. 1 and 3 the chain 50 is spaced from and parallel to chain 32 and adapted to be driven simultaneously therewith by means of a sprocket 52 mounted on the rear end of one of the shafts 30. Sprocket 52 may be driven by means of a chain 53 in any convenient way from the tractor wheel (not shown) of the machine.

The construction of chain 50 is identical with that of chain 32 and for this reason will not be described in detail. Chain 50 supports a series of grain elevating elements 54 which are similar to the elements 33 already mentioned differing only in length for a purpose to be disclosed later.

Each of the elevating elements comprises a pair of prongs 60 and 61 which join the shank 34 in the form of a point 62. Prong 60 may be conveniently termed a raising prong and when the elevating element is in active position, is inclined at an acute angle to the horizontal. Prong 60 together with shank 34 lie in the vertical plane of motion of the elevating elements. (See Figs. 9 and 10.) Prong 61 may be conveniently termed a deflecting prong and lies in the same angular plane with the prong 60, but is inclined rearwardly at an acute angle to the vertical plane of motion of the elevating elements. When the elevating element is in action and moving in the direction of the arrow in Fig. 2, the vertex 62 formed by the junction of the prongs with the shank first engages the grain which thereafter rides up on the prongs while it is simultaneously deflected rearwardly toward the cutting knives by means of prong 61.

The operation of my device is as follows: Consider the machine moving in the direction of the arrow in Fig. 3 and the elevating devices at right angles to the direction of the path of the machine as indicated by the arrow in Fig. 2. The frame 12 is then adjusted so that the elevating elements may properly engage the grain to be raised and cut. The elements 33 on chain 32 are the first to become effective and raise the grain and at the same time deflect it rearwardly toward the elements 54 on the chain 50, whereby it is further raised and simultaneously deflected toward the cutting knives 4 and onto the horizontal conveyer 2. The grain is thereafter advanced by means of the inclined conveyer 3 to the binding mechanism in a manner well understood.

While I have herein shown two driving chains and a corresponding number of series of elevating elements, I do not wish to be limited since for cutting certain grain it may be found desirable to increase this number and in the treatment of other grain it may be found sufficient to use only one of these chains. Furthermore, I do not wish to limit myself to the precise details herein shown as various modifications may be made without departing from the spirit of my invention.

Having thus described my invention, I claim:

1. In a harvesting machine, the combination of a horizontal conveyer, cutting knives moving in close proximity to the ground and adapted to coöperate with the said conveyer together with means located in advance of the said cutting knives and movable in a linear path continuously in a direction transversely to the direction of movement of the said machine for simultaneously elevating prostrate grain and deflecting the same toward the cutting knives and onto the horizontal conveyer.

2. In a harvesting machine, the combination of a horizontal conveyer, cutting knives moving in close proximity to the ground and adapted to coöperate with the said conveyer, means for elevating prostrate grain and deflecting the same toward the cutting knives and onto the horizontal conveyer, said means comprising an endless driving and supporting chain, a series of elevating and deflecting elements supported by the said chain, and movable in a linear path continuously in a direction at right angles to the direction of travel of the machine substantially as shown and for the purpose set forth.

3. In a harvesting machine, the combination of a horizontal conveyer, cutting knives moving in close proximity to the ground and adapted to coöperate with the said conveyer, supporting brackets rigidly attached to the framework of the machine, a vertically adjustable frame supported by the said brackets, an endless driving and supporting chain carried by the said frame, a series of grain elevating and deflecting elements carried by the said chain and adapted to move in a direction at right angles to the direction of travel of the machine, substantially as shown and for the purpose set forth.

4. In a harvesting machine, the combination of a horizontal conveyer, cutting knives moving in close proximity to the ground and coöperating with the said conveyer, supporting brackets rigidly attached to the frame work of the machine, a vertically adjustable frame supported by said brackets, a plurality of spaced parallel driving chains carried by the said frame and adapted to be simultaneously driven, a series of grain elevating and deflecting devices carried by each of the said chains, the grain elevating and deflecting elements on one chain being longer than those of the other chain, substantially as shown and for the purpose set forth.

5. A grain elevating and deflecting device for harvesting machines comprising an endless driving chain, a series of grain elevating elements mounted on the said chain, each element consisting of a shank terminating in a raising prong inclined to the horizontal, both the shank and raising prong lying in the plane of movement of the said elements, a deflecting prong lying in the same angular plane with the raising prong and inclined rearwardly from the junction of the said shank and the raising prong at an angle to the plane of movement of the said elevating elements substantially as shown and for the purpose set forth.

In testimony whereof I have hereunto set my hand in the presence of two subscribing witnesses.

MATHIAS DORNBACH.

Witnesses:
 WILLIAM J. VERNON,
 GEORGE P. YARD.

Copies of this patent may be obtained for five cents each, by addressing the "Commissioner of Patents, Washington, D. C."